United States Patent
Hangoebl (10) Patent No.: US 10,961,086 B2
(45) Date of Patent: Mar. 30, 2021

(54) ASSEMBLY OF A CONTROLLER AND OF A MOBILE CONTROL MODULE

(71) Applicant: Palfinger AG, Bergheim bei Salzburg (AT)

(72) Inventor: Michael Hangoebl, Geretsberg (AT)

(73) Assignee: PALFINGER AG, Bergheim (AT)

( * ) Notice: Subject to any disclaimer, the term of this patent is extended or adjusted under 35 U.S.C. 154(b) by 329 days.

(21) Appl. No.: 15/952,489

(22) Filed: Apr. 13, 2018

(65) Prior Publication Data
US 2018/0229977 A1    Aug. 16, 2018

Related U.S. Application Data

(63) Continuation of application No. PCT/AT2016/060078, filed on Oct. 14, 2016.

(30) Foreign Application Priority Data

Oct. 16, 2015   (AT) .............................. GM 302/2015

(51) Int. Cl.
*B66C 23/00*    (2006.01)
*B66C 13/40*    (2006.01)
(Continued)

(52) U.S. Cl.
CPC ............ *B66C 13/40* (2013.01); *B60P 1/5423* (2013.01); *B66C 23/54* (2013.01); *B66C 23/905* (2013.01);
(Continued)

(58) Field of Classification Search
CPC ....... B66C 13/40; B66C 23/54; B66C 23/905; B66C 23/42; B66C 23/701; B60P 1/5423; B66F 11/044
(Continued)

(56) References Cited

U.S. PATENT DOCUMENTS 7,665,620 B2    2/2010 Morath
8,843,232 B2 *  9/2014 Hartmann .......... G05B 19/4182
                                                    700/230
(Continued)

FOREIGN PATENT DOCUMENTS

AT          14237        6/2015
CN        102815612     12/2012
(Continued)

OTHER PUBLICATIONS

International Search Report dated Jan. 26, 2017 in International (PCT) Application No. PCT/AT2016/060078.
(Continued)

*Primary Examiner* — Khoi H Tran
*Assistant Examiner* — B M M Hannan
(74) *Attorney, Agent, or Firm* — Wenderoth, Lind & Ponack, L.L.P.

(57) ABSTRACT

An assembly of a controller is to be arranged on a hydraulic lifting device, and a mobile control module can remotely operate the controller. Sensor data can be fed to the controller via signal inputs, and a processor of the controller is configured to calculate first information characteristic of a current position of the hydraulic lifting device from the sensor data and from specific data of the hydraulic lifting device stored in a memory. The controller has an operating mode in which parameters for a further position of the hydraulic lifting device and/or for a lifting load can be input at the mobile control module. Second information characteristic of the further position and/or the lifting load is calculated from the parameters, and the stored data is compared with the first information and/or the specific data.

20 Claims, 4 Drawing Sheets

(51) Int. Cl.
*B66C 23/90* (2006.01)
*B60P 1/54* (2006.01)
*B66F 11/04* (2006.01)
B66C 23/42 (2006.01)
B66C 23/70 (2006.01)

(52) U.S. Cl.
CPC ............ *B66F 11/044* (2013.01); *B66C 23/42* (2013.01); *B66C 23/701* (2013.01)

(58) Field of Classification Search
USPC .......................................................... 701/2
See application file for complete search history.

(56) References Cited

U.S. PATENT DOCUMENTS

| | | | |
|---|---|---|---|
| 9,120,653 B2 | 9/2015 | Bohnacker et al. | |
| 9,212,031 B2* | 12/2015 | Schneider | B66C 13/085 |
| 9,505,591 B2 | 11/2016 | Morath et al. | |
| 9,815,668 B2 | 11/2017 | Morath et al. | |
| 2003/0214415 A1* | 11/2003 | Shaw | B66C 13/46 |
| | | | 340/685 |
| 2004/0076503 A1* | 4/2004 | Rau | E04G 21/0463 |
| | | | 414/699 |
| 2004/0085184 A1 | 5/2004 | Sigmund | |
| 2007/0156280 A1 | 7/2007 | Morath | |
| 2007/0173987 A1* | 7/2007 | Rowe | G07C 5/08 |
| | | | 701/2 |
| 2009/0008351 A1* | 1/2009 | Schneider | B66C 13/46 |
| | | | 212/272 |
| 2011/0179783 A1* | 7/2011 | Pirri | F15B 21/008 |
| | | | 60/420 |
| 2012/0095653 A1* | 4/2012 | Morath | B66C 23/905 |
| | | | 701/50 |
| 2012/0101694 A1 | 4/2012 | Morath et al. | |
| 2012/0312767 A1 | 12/2012 | Bohnacker et al. | |
| 2013/0168622 A1* | 7/2013 | Liljedahl | A61G 7/10 |
| | | | 254/8 R |
| 2015/0149026 A1 | 5/2015 | Oswald et al. | |
| 2015/0217976 A1 | 11/2015 | Tanizumi et al. | |
| 2016/0031683 A1* | 2/2016 | Fenker | B66C 13/46 |
| | | | 212/276 |
| 2016/0176686 A1* | 6/2016 | Schoonmaker | B66C 15/045 |
| | | | 701/50 |
| 2016/0223313 A1* | 8/2016 | Vierkotten | G01B 7/30 |
| 2017/0029252 A1 | 2/2017 | Deimer | |
| 2017/0073197 A1 | 3/2017 | Morath et al. | |
| 2018/0162701 A1* | 6/2018 | Henikl | E04G 21/0463 |

FOREIGN PATENT DOCUMENTS

| | | |
|---|---|---|
| CN | 103204442 | 7/2013 |
| DE | 20 2005 020 462 | 5/2007 |
| DE | 20 2010 014 309 | 3/2012 |
| DE | 20 2010 014 310 | 3/2012 |
| JP | 06293495 | 10/1994 |
| JP | 11278789 | 10/1999 |
| JP | 2000-63078 | 2/2000 |
| JP | 2002-326784 | 11/2002 |
| JP | 2008001453 | 1/2008 |
| JP | 2008-127129 | 6/2008 |
| JP | 201106178 | 1/2011 |
| JP | 2014051332 | 3/2014 |
| WO | 02/18264 | 3/2002 |

OTHER PUBLICATIONS

Search Report dated Oct. 11, 2016 in Austrian Application No. GM 302/2015, with English translation.
"The LICCON-Computersystem for Telescope- and Lattice boom cranes", Liebherr-werk Ehingen GmbH, Dec. 1997, downloaded at <http://www.liebherr-datasheets.dk/other/TP244a.D12.97.pdf> (cited in Austrian Search Report).
"Mobile Crane", Liebherr-Werk Enhingen GmbH, Mar. 2013, downloaded at <http://www.liebherr.com/external/products/products-assests/172916/liebherr-product-advantage-mobile-crane-211-ltm-1220-5-2-pn-211-00-e02-2014.pdf>.

* cited by examiner

ASSEMBLY OF A CONTROLLER AND OF A MOBILE CONTROL MODULE

BACKGROUND OF THE INVENTION

1. Field of the Invention

The present invention relates to an assembly of a controller which is arranged or to be arranged on a hydraulic lifting device, and a mobile control module, and a hydraulic lifting device with such an assembly.

2. Description of the Related Art

From DE 20 2010 014 310 U1 by way of example a crane with a controller is known, wherein the controller has an operating mode for simulating work processes in which the operation of the crane in various positions can be simulated. During such a simulated test run the reaching of a threshold value, by way of example a load-torque threshold value, can be displayed on an integrated display of the controller. The disadvantage of such a controller is that the input of control commands and the display of the simulation are restricted to the location of the integrated controller. The simulation of a test run is also time consuming.

SUMMARY OF THE INVENTION

The object of the invention is to provide an assembly of a controller, and of a mobile control module, and a hydraulic lifting device with such an assembly, with which the above-mentioned disadvantages do not occur.

This object is achieved by an assembly according to the invention and a hydraulic lifting device with such an assembly.

The object is achieved according to the invention in that the controller has an operating mode, in which parameters for a further position of the lifting device and/or for a lifting load raised or to be raised by the lifting device can be input at the mobile control module and second information which is characteristic of the further position and/or of the lifting load raised or to be raised by the lifting device, is calculated from said parameters and the stored data and are compared with the first information, wherein the calculation and the comparison are performed by means of the processor of the controller and wherein the mobile control module and the controller communicate with each other in a wireless and/or wired manner.

A mobile controller or a mobile control module can be understood to be an independent (if applicable, portable) control unit, with which a user can move substantially freely within a certain range about a crane or a hydraulic lifting device.

Data or information can obviously be exchanged between such a mobile control module and the crane or the hydraulic lifting device (particularly with their respective controller).

By processing and interpreting the sensor data in the stationary controller arranged or to be arranged on the hydraulic lifting device, use can be made of processors with high processing power without their electrical power consumption having to be a primary consideration.

The sensor data can, by way of example, be produced by pressure sensors, rotary encoders, strain gauges, displacement measuring systems, inclination transmitters or switches, which in each case are arranged on parts of the lifting device, such as for example hydraulic cylinders, swivel or articulated joints, frame parts or extension arms.

The first information characteristic of the position of the lifting device can, by way of example, include the current support situation, geometry or also equipment of the lifting device, and the capacity utilization by a load raised or to be raised. The first information can thus characterize the current position, the current lifting load situation and/or the permissibility of work processes on the lifting device, also including the given current lifting load. In the calculation of these, account can be taken of specific data relating to the precise design of the lifting device stored in a memory, also comprising by way of example threshold values for operating parameters of the lifting device.

Via suitable input means at the mobile control module parameters can be input for a further position of the lifting device and/or for a lifting load raised or to be raised by the lifting device, wherein here the parameters input can reflect the position of the lifting device desired by the user and/or a desired lifting load raised or to be raised by the lifting device.

In an operating mode of the controller suitable for this the parameters input at the mobile control module can be transmitted to the controller. Based on these transmitted parameters, by means of the processor of the controller and the data specific to the lifting device stored in the memory of the controller second information can be calculated. Similarly to the first information, this second information is characteristic of the position characterized by the parameters input and/or the lifting load raised or to be raised by the lifting device. The second information can be assessed for its allowability in terms of the threshold values applicable to the lifting device, contained in the specific data. In addition, this can be compared with the first information, in order to assess whether the further position is achievable based on the first position of the lifting device. An evaluation of a comparison can then be transmitted to the mobile control module.

Here, a transmission of data between the mobile control module and the controller can take place in each case in a wireless and/or wired manner. A wired transmission of the information can, by way of example, take place if a user is within a certain range about a controller arranged or to be arranged on a hydraulic lifting device. In particularly safety-relevant control processes this can also be a requirement for the allowability of the control commands given by the user via the mobile control module.

Here, the lifting device can be a crane, by way of example a vehicle-mountable loading crane, or an aerial work platform.

It has proven advantageous for the mobile control module to have activation possibilities for activation of the operating mode, which can be operated by a user. In this way, the operating mode can be activated, by way of example by a user, at a desired point in time or fora desired period.

It can also be provided that the mobile control module has an energy storage and an activation of the operating mode can take place only with a minimum charge level of the energy storage. This allows it to be prevented that due to a change in the operating mode, and the associated increased energy expenditure, the mobile control module, by way of example when there is already a low charge level of the energy storage, becomes inoperative due to a further, accelerated discharge.

It can also be advantageous for the comparison to include information on the feasibility of transfer of the hydraulic lifting device to the further position characterized by the parameters input and/or the lifting load raised or to be raised. In the process, the processor of the controller can determine if the further position can be achieved whilst observing the threshold values applicable to the lifting device the operating parameters and taking into consideration the equipment of the lifting device. This can also include an assessment of whether the further position and capacity utilization are achievable based on the current position and capacity utilization.

It can also be advantageous if upon activation of the operating mode the first information are transmitted to the mobile control module. This can then serve as a basis for the parameters to be input for the further position also made available to a user, by way of example via a display.

It can be provided that a processor of the mobile control module calculates from the comparison and/or the first information graphic data for a display, displayable via a display unit to a user. This calculation can, by way of example, include here a scaling, a selection and/or a combination of symbols or graphics stored in the control module or an incorporation of calculated graphic data in stored background graphics. The display unit can have a display in the form, by way of example, of a liquid crystal display, an LED display or also an OLED display. When the first information is displayed, a user can be shown the instantaneous position and if applicable the instantaneous lifting load raised by the lifting device. When the comparison is displayed, the assessment of the further position and/or the assessment of the feasibility of a transfer of the lifting device to the further position can be displayed to a user.

It can be advantageous here for the display to take place in the form of a signal indicator, a pictogram or a text output. In this way the display can take place that in an intuitively understandable manner and with low effort.

It can further be provided that the input of the parameters takes place via a mask with input fields at the mobile control module. This allows the input to have a simple design and the parameters can be input in a time-saving manner.

It can be provided that the parameters include the lifting height, the reach and the current or a freely-selectable lifting load. Here, the lifting height can be understood to be the vertical distance from the boom tip, thus the furthest end of the crane arm or an extension arranged thereon, or the vertical distance from a lifting load raised or to be raised by the crane from a reference plane of the crane, by way of example from the bottom edge of the crane pedestal, for a given swing angle. Alternatively, the lifting height parameter can characterize a vertical distance from the boom tip or a lifting load relative to the current crane position or position of the lifting load. Similarly, the reach parameter can characterize the horizontal distance of the boom tip or the horizontal distance of a lifting load raised or to be raised by the crane from the swivel axis, more precisely from the substantially vertically located swivel axis of the crane column on the crane pedestal, for a given swing angle, or also alternatively a horizontal distance of the boom tip or a lifting load relative to the current crane position or position of the lifting load. It is also conceivable for the parameters to comprise a set of coordinates in a spatial or plane coordinates system, by way of example using spherical coordinates, cylindrical coordinates or Cartesian coordinates. Here, a characterization of the reach can then also take place separately from the characterization of the lift height. An input or and/or capture of GPS coordinates of the boom tip or the lifting load is similarly conceivable. It is also conceivable for a parameter to characterize a part or an assembly of the crane, such as by way of example the telescope position of a telescopable crane arm extension or the angle of rotation or articulation angle of a crane arm.

With such a set of parameters, a desired position of the lifting device can be characterized accurately and accessibly for a user.

It can further preferably be provided that the controller has a further operating mode, in which the processor of the controller calculates a sequence of control commands for transferring the hydraulic lifting device to the position characterized by the parameters input. In doing so, the processor can create a set of control commands, with which the lifting device can be brought into the further position, and if applicable store these in a memory. Here the current position can serve as the starting position.

The transfer can involve a change in geometry, a lifting maneuver or also a combination of the two.

It can be advantageous here for the mobile control module to have further activation possibilities for activating the calculation of the control commands, operable by a user.

Thus, the calculation can take place at a point in time desired by the user without placing unnecessary demands on the computing time of the processor.

It can further be provided here for the mobile control module to have operating possibilities, preferably a control lever, for controlling the issue of the control commands for transfer of the hydraulic lifting device to the position characterized by the parameters input, operable by a user. This can, by way of example, take place in the form of a pushbutton or a self-resetting control lever, so that when operated the sequence of control commands, that may relate to various parts of the lifting device, are output by the controller. In this way, operation of the controller can be simplified considerably.

It can be advantageous here for the transfer to take place only as far as a position of the lifting device allowed according to the first information. It can thus be ensured that by means of the transfer, the lifting device does not enter an inadmissible state in the context of the threshold values. Thus, by way of example, an approach to an actually inadmissible further position can take place to the extent allowed in the context of the applicable threshold values for operating parameters.

Here it can be of further advantage that through the operating possibilities, preferably the control lever, the speed of transfer of the hydraulic lifting device into the position characterized by the parameters input is controllable. This allows the user to control the rate of issue of the control commands and thus also the speed of the geometry change of the lifting device.

Protection is also requested for a hydraulic lifting device, in particular a loading crane for a vehicle, particularly preferably an articulated arm crane or an aerial work platform, with an assembly as described above.

BRIEF DESCRIPTION OF THE DRAWINGS

Exemplary embodiments of the invention are discussed on the basis of the figures.

DETAILED DESCRIPTION OF THE INVENTION

Figure 1:
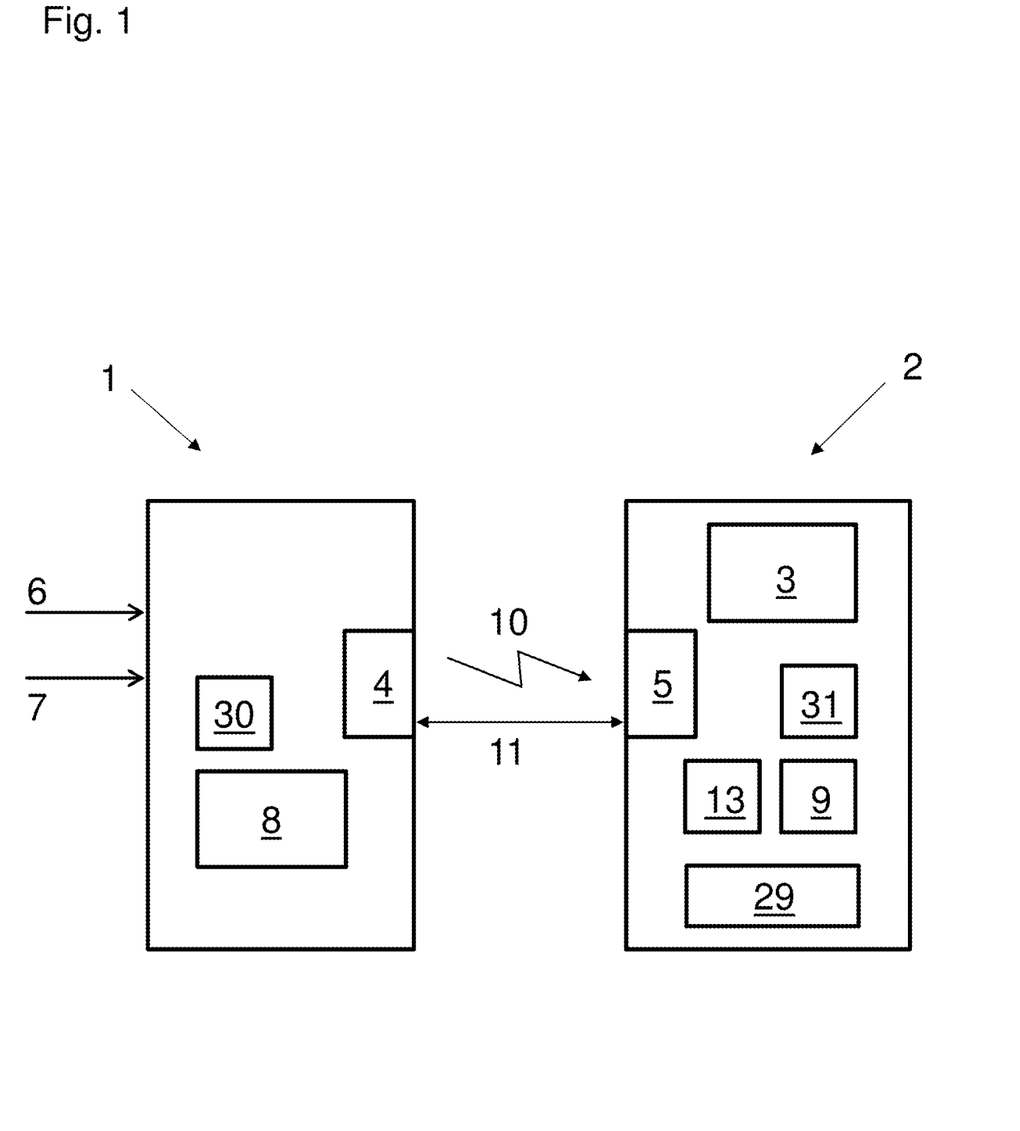
FIG. 1 shows a schematic representation of an exemplary embodiment of an assembly according to the invention.

The controller 1 receives via signal inputs 6, 7 sensor data regarding the geometry of the lifting device, the support situation and if applicable the lifting load. In a processor 8 the controller 1 calculates from these data and from stored data specific to the lifting device first information which is characteristic of the current lifting load situation, position and/or the permissibility of work processes on the lifting device—if necessary in the given current lifting load situation.

The controller 1 also has a memory 30, in which data specific to the lifting device can be stored. These can comprise information on the equipment, functions and threshold values of operating parameters of the lifting device. The calculation of the first information, which is characteristic of the current position and capacity utilization, can advantageously take place with the inclusion of the data stored in the memory 30.

By means of a transceiver unit 4 of the controller 1 data can be transmitted via a wireless link 10 or a wired link 11 to a transceiver unit 5 of the mobile control module 2. A combination of transmission with a wireless link 10 and a wired link 11 is also conceivable. The wireless link 10 can send and receive data via a plurality of channels and in a plurality of frequency bands, including in parallel.

The mobile control module 2 comprises a memory 31 in which the information transmitted, and also graphic data calculated, by a processor 9, for a display of this on a display unit 3 can be stored. For input of data by a user, input means 13 can also be provided.

For the power supply, the mobile control module 2 comprises an energy storage 29, by way of example in the form of a rechargeable battery. The power supply of the controller 1 can take place by means of a unit (not shown) of the lifting device.

Figure 2:
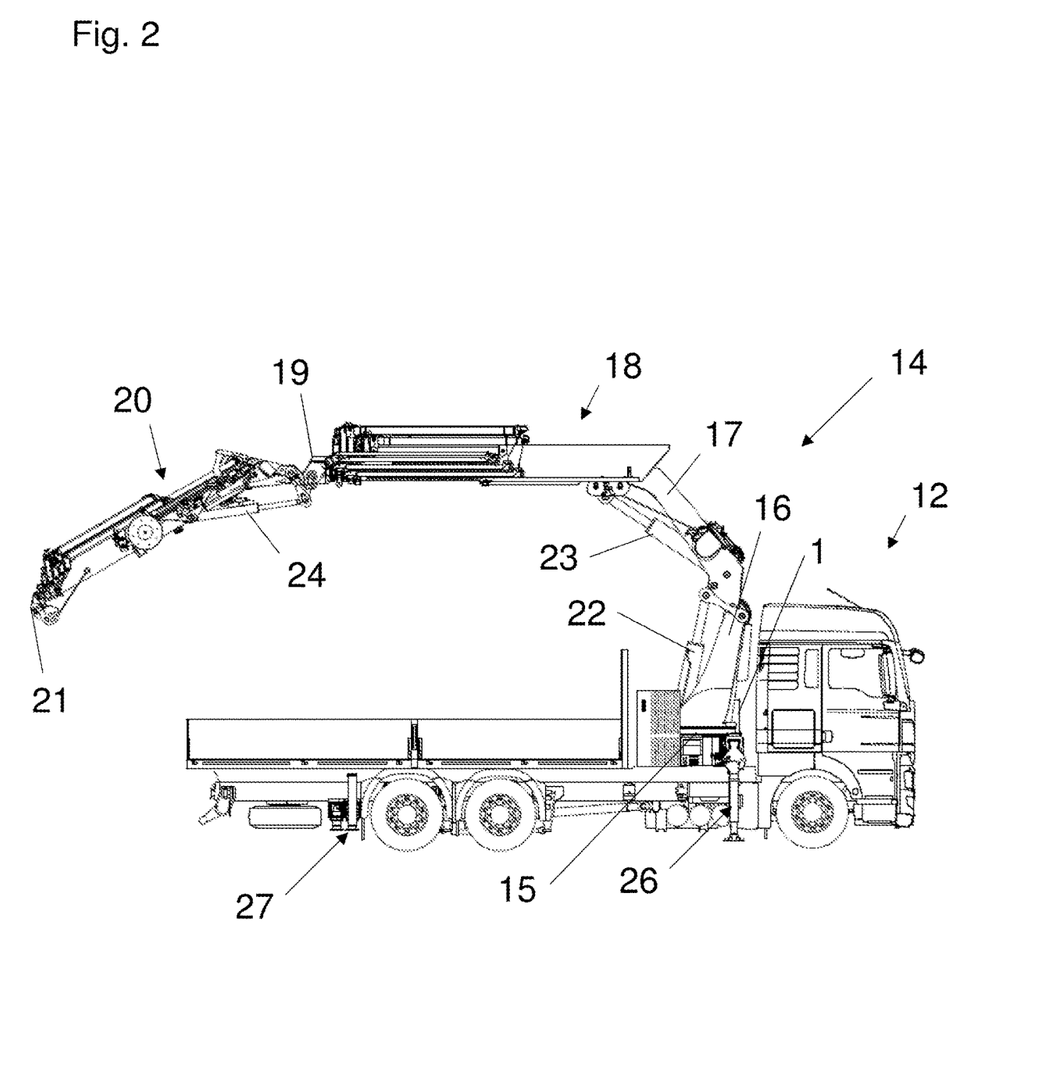
FIG. 2 shows an implementation of a lifting device arranged on a vehicle.

FIG. 2 shows an implementation of a lifting device arranged on a vehicle 12 and a controller 1 arranged thereon. The vehicle 12 comprises a loading platform for receiving or also transporting a payload or also a ballast weight. A lifting device in the form of a crane 14 is connected via the crane pedestal 15 with the vehicle 12. The crane pedestal 15 supports a crane column 16 rotatable about the vertical axis. On the crane column 16 a lift arm 17 able to swivel about a horizontal axis by means of a hydraulic cylinder 22 is arranged. On the lift arm 17, in turn a crane arm extension 18 able to swivel about a horizontal axis by means of a hydraulic cylinder 23, with at least a telescoping crane thrust arm 19 is arranged. As shown in the implementation in FIG. 2, on the crane arm extension 18 an attachment arm 20, similarly able to swivel about a horizontal axis by means of a hydraulic cylinder 24, can be arranged. Similarly, the attachment arm 20 can have at least a telescoping crane thrust arm 21. For additional support of the crane 14 or the vehicle 12 carrying the lifting device a support device in the form of the cantilever arms 26, 27, which can have extending, telescoping support legs is provided.

Figure 3:
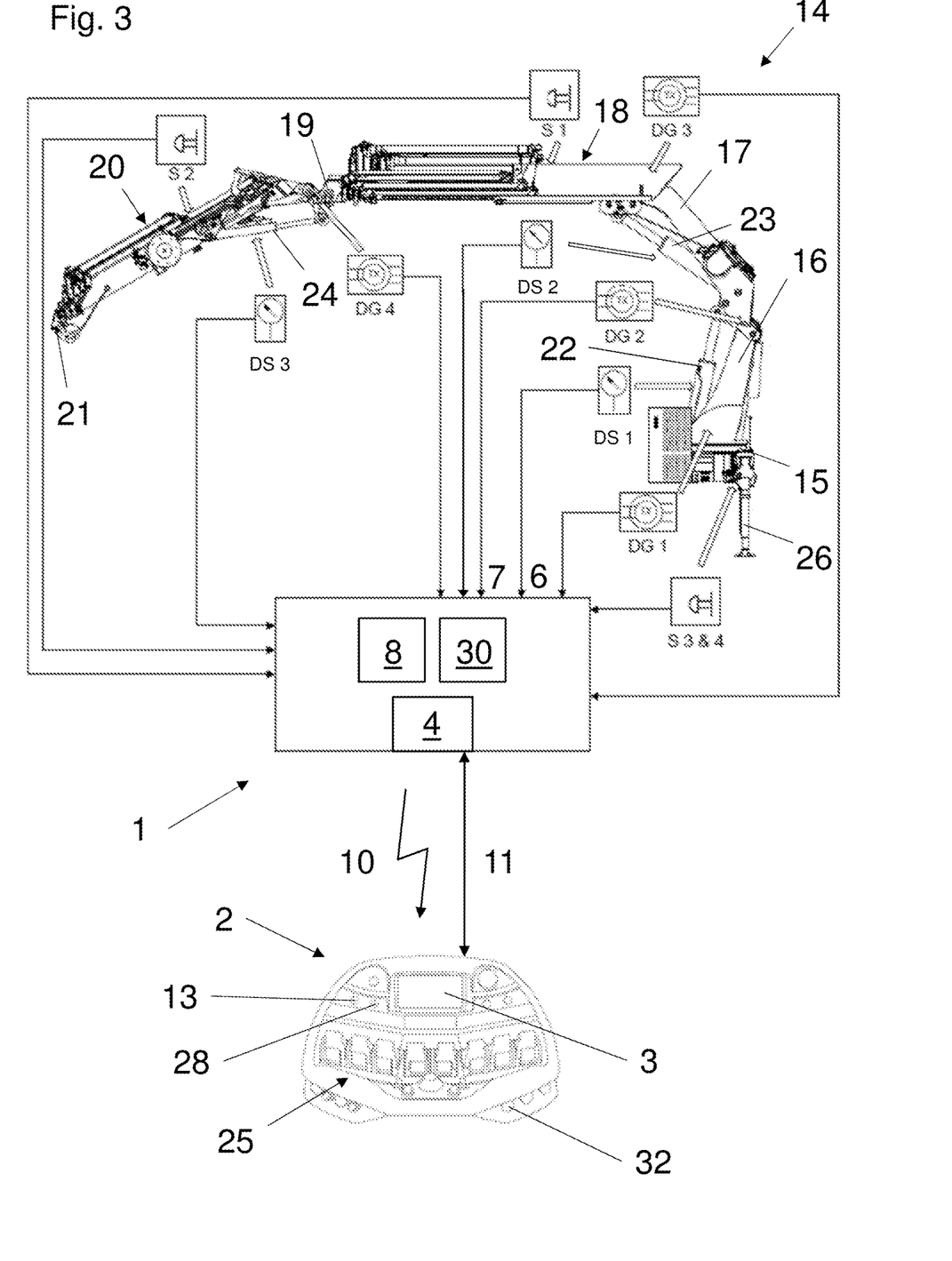
FIG. 3 shows a schematic representation of an exemplary embodiment of a lifting device and an assembly according to the invention and FIGS. 4a and 4b show in each case a schematic representation of an input mask and graphic data calculated from the second information.

FIG. 3 is a schematic representation of an exemplary embodiment of a lifting device and an assembly according to the invention of a controller 1 and of a mobile control module 2. The lifting device here in the form of a crane 14, in addition to the abovementioned components, has various sensors for capturing the instantaneous position and capacity utilization of the crane 14. For the cantilever arm 26, which can be designed bilaterally on the crane pedestal 15, switches S3, S4 for capturing the support state of the cantilever arm 26 on the floor are provided. Similarly, such sensor technology can be provided for the cantilever arm 27, not shown here, which can be arranged on a frame part of the vehicle 12. It is also conceivable for the extended position of the cantilever arms 26, 27 to be captured by a displacement measuring system (not shown). To capture the rotation or swing angle of the crane column 16 relative to the crane pedestal 15 a rotary encoder DG1 is provided. The rotation angle of the crane column 16 about a vertical axis, captured by the rotary encoder DG1, would correspond to the polar angle in a polar representation. To capture the articulation angle in a vertical plane between the crane column 16 and the lift arm 17 a further rotary encoder DG2 is provided. For the hydraulic pressure in the hydraulic cylinder 22 of the lift arm 17, characteristic of the crane capacity utilization, a pressure sensor DS1 is provided. For the capture of the articulation angle between the lift arm 17 and the crane arm extension 18 in a vertical plane, a rotary encoder DG3 is provided. To capture the hydraulic pressure in the hydraulic cylinder 23 of the crane arm extension 18, a pressure sensor DS2 is provided. To capture the retracted state of a crane thrust arm 19 of the crane arm extension 18, a switch S1 is provided. To capture the articulation angle between the crane arm extension 18 and the attachment arm 20 in a vertical plane, a rotary encoder DG4 is provided. To capture the hydraulic pressure of the hydraulic cylinder 24 of the attachment arm 20, a pressure sensor DS3 is provided. To capture the retracted state of a crane thrust arm 21 of the attachment arm 20, a switch S2 is provided. Essentially, the possibility should not be ruled out of capturing the thrust position of the individual crane thrust arms by means of a thrust position sensor with, by way of example, a displacement measuring system. Thus, by capturing the geometry of the lifting device and by measuring further operating parameters, such as for instance the hydraulic pressure in the lift cylinders, the horizontal shift, lift height and lifting load raised can be determined.

The sensor data are fed to the controller 1 in each case via signal inputs, of which by way of example signal inputs 6, 7 of the pressure sensor DS1 and of the rotary encoder DG2 are identified. In the controller 1, from these sensor data and from in this example data specific to the crane 14 stored in a memory 30, first information is calculated, characteristic of the current crane position and, if applicable, also of the instantaneous lifting load raised. By means of a transceiver unit 4 of the controller 1, this information can then be transmitted via a wireless link 10 and/or a wired link 11 to a transceiver unit 5 of a mobile control module 2. From this information in a suitable operating mode in the mobile control module 2 graphic data can be calculated for a display and displayed to the user via a display unit 3. An activation of the operating mode can, if applicable, take place by means of an activation possibility 28 operable by the user, by way of example in the form of a switch or a pushbutton. An activation of the operating mode on the mobile control module 2 can optionally be notified to the controller 1, whereupon the latter transmits the first information to the mobile control module 2. This can then be displayed in edited form on the display unit 3. Alternatively, it is conceivable for a transmission and display of the first information to be actively requested by a user. The display of the first information, which by way of example can comprise the lift height, the reach and the current lifting load of the crane 14, can indicate to the user the instantaneous crane position.

For the input of data, such as by way of example the parameters characteristic of a desired further position of the crane 14, the mobile control module 2 can have suitable input means 13. For the operation of the mobile control module 2 and for the input of control commands, on the mobile control module 2 various control elements 25 are provided. An operating possibility 32 in the form by way of example of a moveable control lever can be provided, which can serve as a master switch for performing semi-automated movement patterns of the crane 14.

Figure 4A:
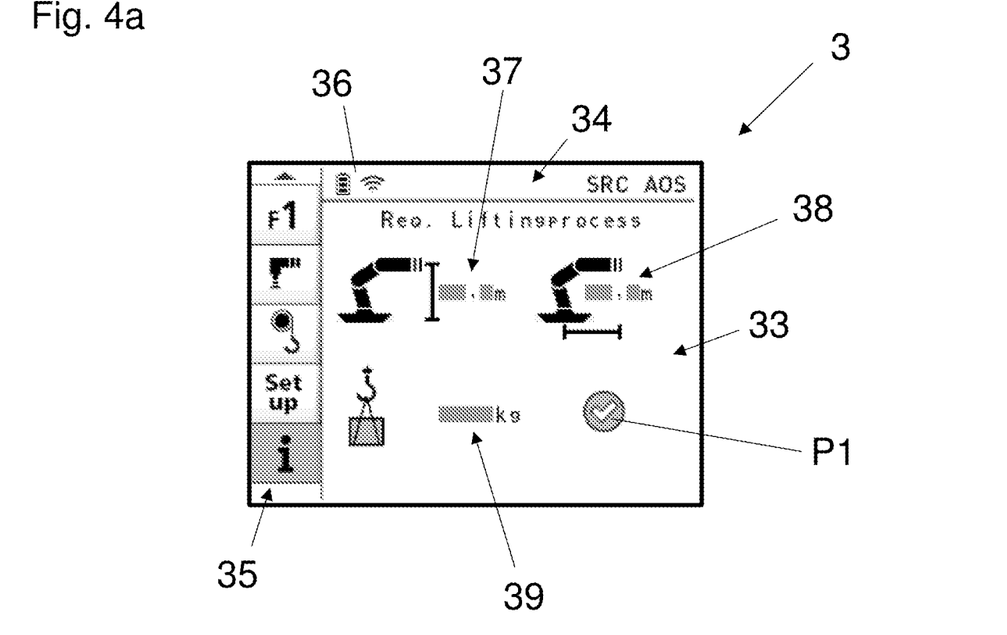

FIG. 4a is a schematic representation of an input mask 33 displayed on a display unit 3. Here, the mobile control module 2 is in the suitable operating mode for querying the feasibility of a lifting maneuver. The display unit 3 can, by way of example, be designed as a graphics-capable liquid crystal display, attached or to be attached to the mobile control module 2. In the implementation shown, the display on the display unit 3 comprises a menu bar 35, via which settings, information or alternative functions can be accessed, and a title bar 34 with for instance a status indicator 36, indicating the charge level of the energy storage 29 or also the nature and quality of the data link.

The input mask 33 comprises further input fields 37, 38, 39, in which for querying the admissibility of a desired further position of the crane 14 the parameters characteristic of that position can be input. In doing so, the desired lifting height of the lifting load raised or to be raised can be input in input field 37 for the lifting height. The desired horizontal shift of the crane 14 can be input in input field 38 for reach. Here, the lifting height and reach can be selected independently of one another. A desired lifting load to be raised can be input in input field 39. This can also take place in certain increments, thus by way of example in steps of 50 kilograms. If input field 39 for the lifting load is left blank or a value of zero is input, the weight of the lifting load currently captured on the crane 14 can be used. It can be provided that the first information characteristic of the instantaneous position of the crane 14 is displayed in the form of the current lifting height, reach and the current load raised, in input fields 37, 38, 39 prior to input of the desired parameters.

Figure 4B:
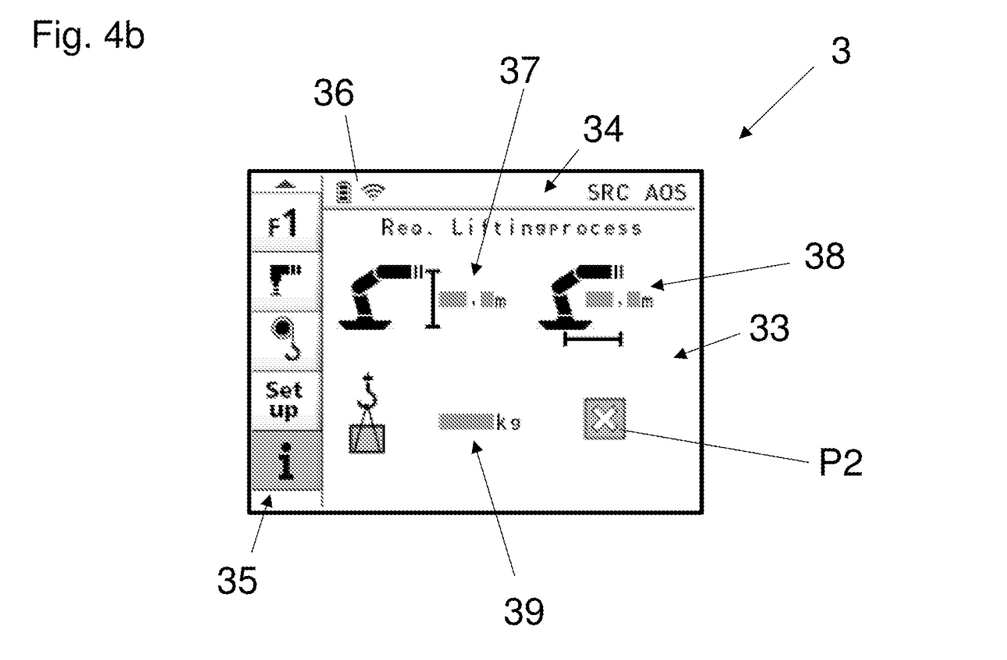

Once input of the parameters is complete, these are transmitted in a wireless 10 and/or wired 11 manner to the controller 1. There, the processor 8 calculates from the data specific to the crane stored in the memory 30 and the parameters input, second information characteristic of the further position of the crane 14. These can contain the permissibility of the position of the crane 14 in the context of the permissible threshold values and the capabilities of the crane 14. The second information can be compared by the processor 8 with the first information. From this an assessment can be made of the feasibility of a lifting maneuver from the current position of the crane 14 to the desired, further position of the crane, characterized by the parameters input. The evaluation of the comparison can be transmitted again in a wireless 10 and/or wired 11 manner back to the mobile control module 2. There, the processor 9 of the mobile control module 2 can calculate from the comparison graphic data for a display, displayable via the display unit 3 to a user. The calculation here can, by way of example, comprise a selection and/or a combination of pictograms P1, P2 stored in the control module 2 and an incorporation of the calculated graphic data in the stored background graphics. FIG. 4a shows the display of pictogram P1, symbolizing a positive evaluation of the feasibility of the desired lifting maneuver. FIG. 4b, on the other hand, shows the display of pictogram P2, symbolizing a negative assessment of the feasibility of the lifting maneuver, thus an inadmissible position in the context of the threshold values.

After, or at the time of, a positive assessment of the transferability of the crane 14 from the current position to the further position, if applicable, by operation of the further activation possibilities 28 by a user, the processor 8 of the controller can calculate a sequence of control commands, by means of which the crane 14 can be transferred to the desired position. This can, by way of example, comprise the swiveling and telescoping of the crane and thrust arms of the crane 14 and/or a raising or lowering of a lifting load by the crane 14 in a specific sequence. The issue of the control commands by the controller 1 on the crane 14 can take place by means of an operating possibility 32, by way of example by displacement of a control lever serving as a master switch on the mobile control module 2. Here, the speed of transfer of the crane 14 to the further position can be proportional to the operation of the operating possibility 32, thus, by way of example, the lever displacement. It is of course advantageous if the transfer of the crane 14 to the further position at any point in time takes place whilst observing the applicable threshold values of the crane 14 contained in the first information.

LIST OF REFERENCE NUMERALS

Controller 1
Control module 2
Display unit 3
Transceiver unit 4
Transceiver unit 5
Signal input 6, 7
Processor 8
Processor 9
Wireless link 10
Wired link 11
Vehicle 12
Input means 13
Crane 14
Crane pedestal 15
Crane column 16
Lift arm 17
Crane arm extension 18
Crane thrust arm 19
Attachment arm 20
Crane thrust arm 21
Hydraulic cylinder 22, 23, 24
Control elements 25
Cantilever arms 26, 27
Activation possibility 28
Energy storage 29
Memory 30
Memory 31
Operating possibility 32
Input mask 33
Title bar 34
Menu bar 35
Status display 36
Input field 37, 38, 39
Pressure sensor DS1, DS2
Rotary encoder DG1, DG2, DG3, DG4
Switch S1, S2, S3, S4
Pictogram P1, P2

The invention claimed is:

1. An assembly comprising:
a controller for a hydraulic lifting device, and
a mobile control module for remotely operating the controller,
wherein;
the controller is configured to receive sensor data via a signal input;

a processor of the controller is configured to calculate first information, which is characteristic of a current position of the hydraulic lifting device and/or a lifting load raised by the hydraulic lifting device, from the sensor data and from specific data of the hydraulic lifting device that are stored in a memory;

the controller has an operating mode in which the controller is configured to receive parameters for a further position of the hydraulic lifting device and/or for the lifting load from the mobile control module;

the processor of the controller is configured to: (i) calculate second information, which is characteristic of the further position and/or the lifting load from the parameters and the stored data; and (ii) compare the second information with the first information and the specific data to assess allowability thereof in terms of threshold values applicable to the hydraulic lifting device, contained in the specific data, and to assess whether the further position is reachable by the hydraulic lifting device based on the current position; and the controller is configured to transmit an evaluation of the comparison to the mobile control module.

2. The assembly according to claim 1, wherein the mobile control module has activation possibilities for activating the operating mode for operation by a user.

3. The assembly according to claim 1, wherein the mobile control module has an energy storage and the mobile control module is configured to activate the operating mode only with a minimum charge level of the energy storage.

4. The assembly according to claim 1, wherein the comparison includes information on a feasibility of transfer of the hydraulic lifting device to the further position and/or the lifting load.

5. The assembly according to claim 1, wherein the controller is configured to transmit the first information to the mobile control module upon activation of the operating mode.

6. The assembly according to claim 1, wherein a processor of the mobile control module is configured to calculate, from the comparison and/or the first information, graphic data for a display, displayable via a display unit to a user.

7. The assembly according to claim 6, wherein the display includes a signal indicator, a pictogram or a text output.

8. The assembly according to claim 1, wherein the mobile control module is configured to display a mask with input fields for input of the parameters.

9. The assembly according to claim 1, wherein the parameters include a lifting height, a reach, a current lifting load or a freely-selectable lifting load.

10. The assembly according to claim 1, wherein the controller has a further operating mode, in which the processor of the controller is configured to calculate a sequence of control commands for transfer of the hydraulic lifting device to the further position.

11. The assembly according to claim 10, wherein the mobile control module has activation possibilities, operable by a user, for activating the calculation of the sequence of control commands.

12. The assembly according to claim 10, wherein the mobile control module has operating possibilities, operable by a user, for controlling an issue of the control commands for transfer of the hydraulic lifting device to the further position.

13. The assembly according to claim 12, wherein the transfer is limited to a position of the lifting device allowed according to the first information.

14. The assembly according to claim 12, wherein, through the operating possibilities, a speed of transfer of the hydraulic lifting device into the further position is controllable.

15. The assembly according to claim 12, wherein the operating possibilities include a control lever.

16. A hydraulic lifting device comprising the assembly according to claim 1.

17. The hydraulic device according to claim 16, wherein the hydraulic lifting device is a crane.

18. The hydraulic device according to claim 16, wherein the hydraulic lifting device is an aerial work platform.

19. The assembly according to claim 1, wherein the mobile control module and the controller are configured to communicate with each other in a wireless manner.

20. The assembly according to claim 1, wherein the mobile control module and the controller are configured to communicate with each other in a wired manner.

* * * * *